Jan. 17, 1956     D. R. DE BOISBLANC     2,730,896
CIRCUIT FOR MEASURING THE AVERAGE INTENSITY OF DISTURBANCES
Filed Oct. 16, 1950
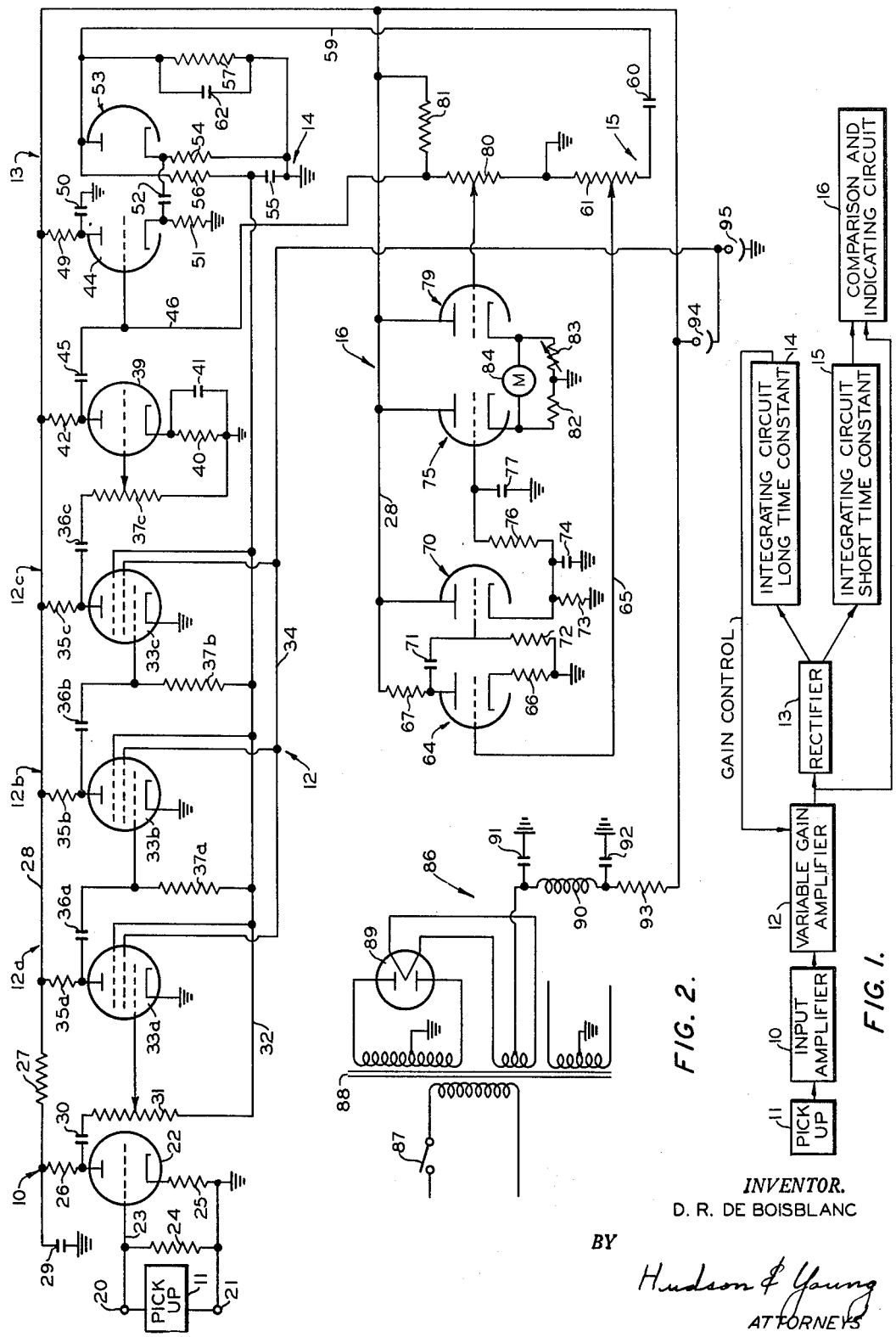
INVENTOR.
D. R. DE BOISBLANC
BY
Hudson & Young
ATTORNEYS

United States Patent Office 2,730,896
Patented Jan. 17, 1956

2,730,896

CIRCUIT FOR MEASURING THE AVERAGE INTENSITY OF DISTURBANCES

Deslonde R. de Boisblanc, Bartlesville, Okla., assignor to Phillips Petroleum Company, a corporation of Delaware Application October 16, 1950, Serial No. 190,405

11 Claims. (Cl. 73—116)

This invention relates to apparatus for determining combustion instability in a jet engine. In another aspect, it relates to a circuit for measuring the average intensity of short-term disturbances, such as those resulting from short-term fluctuations in engine noise, relative to a slowly varying amplitude level, such as the general noise level of the engine. In still another aspect, it relates to an improved circuit of the automatic volume control type.

In testing jet engines, the onset of unstable combustion is indicated by rapid short-term fluctuations in the acoustical noise produced by the flame of the jet burner. Thus, by measuring the average intensity of these short-term fluctuations, an accurate indication is obtained of the stability of combustion in the engine. It is very desirable, in this connection, to adjust the indication thus obtained to eliminate variations caused by changes in the long-term or general noise level produced by stable combustion, which changes would otherwise impair the accuracy of measurement of the short-term fluctuations.

In accordance with this invention, I have provided a novel circuit of the automatic volume control type to carry out the method of my invention, this circuit being of value independently in applications other than in testing of jet engines in the manner specified. For example, the circuit can be applied to seismic prospecting to eliminate the effect of a slowly varying amplitude level upon measurements of the average intensity of short-term seismic disturbances. Various other applications of the circuit are possible, other than the use thereof as a testing circuit.

It is an object of the invention to provide an improved circuit of the automatic volume control type which is particularly suitable for measuring the stability of combustion in a jet engine.

It is a further object to provide such a circuit having independent utility in fields other than testing.

It is a still further object to provide a circuit which is reliable in operation, accurate, and utilizes a minimum number of standard circuit components.

Various other objects, advantages and features of the invention will become apparent from the following detailed description taken in conjunction with the accompanying drawings, in which:

Figure 1 is a block diagram of the circuit of this invention; and

Figure 2 is a schematic circuit diagram of a preferred embodiment of the invention.

Referring now to Figure 1, an input amplifier 10 is fed by a pickup 11 which converts the quantity to be measured into an electrical voltage representative thereof. In a preferred application of the invention, the pickup is an electromagnetic detector capable of picking up acoustical noise from the burner of a jet engine. In each case, the voltage at the output of amplifier 10 has an average amplitude level which varies slowly in accordance with the changes in the stable combustion level of the engine. Superimposed upon this slowly varying voltage are short-term variations, the average value of which is a measure of combustion instability in the engine. Preferably and advantageously, the voltages are filtered to substantially attenuate and eliminate frequencies of less than 200 cycles or greater than 20,000 cycles. In general, the electromagnetic pickup inherently attenuates signals above 20,000 cycles while the elimination of low frequency signals is accomplished by suitable filter circuits incorporated in the amplifiers.

From the amplifier 10, the voltage is fed to a variable gain amplifier 12 which, in turn, feeds a rectifier 13. The rectified signals from unit 13 are fed to an integrating circuit 14 having a relatively long time constant and to an integrating circuit 15 having relatively short time constant. The output of integrating circuit 14 is fed to a suitable control electrode of one or more tubes in the variable gain amplifier 12 so as to regulate the amplification thereof and provide an output which is substantially independent of long-term changes in the amplifier input. In this respect, the operation of the circuit is similar, except for the length of the time constant, to conventional automatic volume control circuits.

The integrating circuit 15, due to its short time constant, is responsive to short-term fluctuations in the signals produced by amplifier 12 but not to long-term variations in amplitude level. The integrated output of this circuit is fed to a comparison and indicating circuit 16 which reads or indicates the average value of the short-term fluctuations. Although, in theory, the output of amplifier 12 is constant and independent of long-term variations, it is very desirable, in practical operation of the circuit, to compare the output of integrating circuit 15 with that of amplifier 12 to produce a resultant voltage which is then indicated. To this end, the circuit 16 has been designated as a comparison and indicating circuit and receives a portion of the output of variable gain amplifier 12.

When pickup 11 is utilized to measure acoustical noise at the burner of a jet engine, it will be evident that integrating circuit 15 produces an output variable voltage which is representative of the average intensity of short-term variations in engine noise, the average value of this output variable being an indication of the stability of combustion. Further, integrating circuit 14, in cooperation with rectifier 13 and amplifier 12, produces a compensating effect eliminating variations in the general noise level of the engine. It will be evident that the circuit can be readily applied to measuring the average intensity of any short-term disturbance relative to a slowly varying amplitude level by changing the nature of the pickup 11. Furthermore, the combination of units 12, 13, 14 and 15 has independent utility in electronic devices.

In Figure 2, I have shown a preferred circuit embodying the components shown in the block diagram of Figure 1. It will be understood, however, that this circuit is illustrative only and that the nature and arrangement of electronic components in each circuit element can be varied to a great extent without departing from the invention which resides in a new combination of known elements, rather than in the novelty of the elements themselves.

Referring now to Figure 2, the pickup 11 is connected to an input terminal 20 and a grounded input terminal 21, the component 20 being connected to the control grid of an amplifier tube 22 by a lead 23, this lead also having a grounded grid resistor 24 attached thereto. The cathode of tube 22 is connected to ground through a bias resistor 25 and the anode is connected through resistances 26 and 27 to a positive power supply line 28, a grounded filter condenser 29 being attached to the junction between resistances 27 and 26. These parts constitute the amplifier 10 of Figure 1, the function of which is merely to amplify the electrical voltages produced by pickup 11.

The anode of tube 22 is also connected by a coupling condenser 30 to one fixed terminal of a potentiometer 31, the other fixed terminal of which has secured thereto a lead 32 to which an automatic volume control voltage is supplied in the manner hereinafter described. The contactor of potentiometer 31 is connected to the input grid of the variable gain amplifier 12. This amplifier consists of the tubes 33a, 33b, 33c and 39 which are preferably of the pentode type, and, accordingly, each tube includes an anode, a cathode, a control grid, a screen grid, and a suppressor grid. The cathodes of the tubes are grounded, the screen grids are all connected to a positive power supply line 34, the suppressor grids are all attached to the automatic volume control conductor 32, and the anodes are connected through coupling resistors 35a, 35b and 35c, respectively, to positive power supply line 28. The anodes of the tubes are further connected through the respective coupling condensers 36a, 36b and 36c to the control grid of the tube in the next succeeding stage, these control grids being provided with grid resistances 37a, 37b and 37c, of which resistances 37a and 37b are connected to automatic volume control conductor 32. Resistance 37c is a potentiometer having one fixed terminal thereof grounded and its contactor attached to the control grid of an amplifier tube 39. It will be noted that the output of amplifier 10 is applied to the control grid of tube 33a through coupling condenser 30 and potentiometer 31, the input voltage being amplified in the successive stages 12a, 12b and 12c for application to the control grid of tube 39. The gain of the three stages of amplification is regulated by the voltage applied to the automatic volume control conductor 32.

The cathode of tube 39 is connected to ground through a bias resistor 40 which is shunted by a filter condenser 41, the anode of this tube being attached to lead 28 by a resistor 42 and to the control grid of a tube 44 by a coupling condenser 45 and a lead 46, which is the output lead of the variable gain amplifier. The anode of tube 44 receives an operating potential from lead 28 through a resistance 49 and is grounded through a bypass condenser 50, the cathode of this tube being grounded through a bias resistor 51 and connected, through a coupling condenser 52, to the cathode of a rectifier tube 53 which is grounded through a bias resistor 54.

The integrating circuit 14 is fed by rectifier tube 53 and includes an integrating condenser 55 adapted to discharge through series connected resistances 56 and 57, one terminal of the condenser being grounded and the other terminal having attached thereto the automatic volume control conductor 32. Rectified output voltage from amplifier 12 is applied to the integrating circuit just described by the connection of the anode of rectifier tube 53 to the junction between fixed resistances 56, 57 of the integrating circuit. The integrating circuit, therefore, produces an automatic volume control voltage which varies the gain of tubes 33a, 33b and 33c to maintain a substantially constant amplifier output with respect to fluctuations of input voltage of a frequency determined by the time constant of the integrating circuit. In one preferred embodiment of the invention, condenser 55 has a value of one microfarad while resistances 56 and 57 have values of five megohms and one megohm, respectively. The time constant of the circuit is, accordingly, six seconds so that the integrating circuit adjusts the amplifier gain only in response to long-term fluctuations in signal strength. In other words, the integrating circuit maintains the general signal level at the amplifier output at a substantially constant value, as in the usual automatic volume control circuit.

It will be noted that a lead 59 extends from the anode of rectifier tube 53 to the integrating circuit 15, this circuit including an integrating condenser 60, a potentiometer 61, and the resistance 57. In a preferred practical circuit, condenser 60 has a value of 0.1 microfarad, potentiometer 61 has a resistance of one megohm and resistance 57, as previously stated, has a resistance of one megohm. Accordingly, the time constant of integrating circuit 15 is 0.2 second corresponding to a frequency of five cycles per second. As a result, this integrating circuit is responsive to the short-term disturbances of frequencies in the neighborhood of five cycles per second and is not substantially affected by the long-term disturbances which actuate the automatic volume control system through integrating circuit 14.

In the circuit shown, as stated, the time constant of integrating circuit 14 is six seconds and the time constant of integrating circuit 15 is 0.2 second. That is, the time constant of integrating circuit 14 is thirty times greater than the time constant of integrating circuit 15. In general, the time constant of integrating circuit 14 should be at least ten times the time constant of the integrating circuit 15 in order to effect proper discrimination between the long-term and short-term disturbances.

It will be noted that resistance 57 is shunted by a condenser 62, which may be an 0.1 microfarad condenser. The function of this condenser is, in effect, to amplify the very sharp pulses reaching the circuit 15 from the amplifier 12, these pulses representing the short-term disturbances which it is desired to measure. The condenser is very rapidly charged by such a sharp pulse but the discharge rate thereof is considerably slower than its charging rate, since the time constant of the circuit 57, 62 is 0.1 second. Thus, the condenser 62 and its resistance 57 provide a relatively wide pulse when a relatively sharp impulse is applied thereto, this wide pulse being more readily accumulated by the condenser 60 of integrating circuit 15.

The output of integrating circuit 15, appearing at the contactor of potentiometer 61, is impressed upon the control grid of an amplifier tube 64 by a lead 65, the cathode of this tube being grounded through a bias resistor 66, and the anode being connected to line 28 through a resistance 67 and to the control grid of a second amplifier tube 70 through a coupling condenser 71. The control grid of tube 70 has a grounded grid resistor 72 and the anode of this tube is attached directly to line 28. The cathode of the tube grounded through a resistance 73 and a condenser 74, this element also being connected to the control grid of a tube 75 through a resistance 76, a grounded condenser 77 also being attached to the control grid. The tubes 64 and 70 function as amplifiers while the condensers 74, 77 in conjunction with resistances 73, 76 provide an additional accumulative or averaging of the pulses fed thereto from integrating circuit 15 through the amplifier tubes 64 and 70.

Tube 75 forms a part of the comparison and indicating circuit 16, which also includes a tube 79, the control grid of which is connected to the contactor of a potentiometer 80, one fixed terminal of which is grounded, and the other fixed terminal of which is attached, on one hand, to output lead 46 of amplifier 12 and, on the other hand, to lead 28 through a resistance 81. In this manner, the output voltage of amplifier 12 is applied to the control grid of tube 79 while the integrated voltage from circuit 15 is applied to the control grid of tube 75.

The anodes of tubes 75, 79 are both connected to line 28 while the cathodes are grounded through a fixed resistance 82 and a variable resistance 83, respectively. The cathodes of the tubes are further connected by a meter 84, which reads the difference in potential between the cathodes of the tubes 75, 79 and, therefore, compares the output of amplifier 12 with the output of integrating circuit 15 to produce a resultant output voltage which is read upon the meter 84.

When the circuit is utilized for testing jet engines in the manner already described, the meter reads the average value of the short-term fluctuations in acoustical noise resulting from instability of combustion in the engines, relative to the long-term noise level. The condensers 30 and 36 are preferably of such capacitance as to attenuate signals of frequencies less than 200 cycles when testing jet engines. It will be understood that, if the amplifier 12 and its associated automatic volume control circuit function in an ideal manner, the comparison produced by the interaction of tube 75, 79 is not essential, since the amplifier output voltage is substantially constant. However, in a practical circuit, greatly improved results are obtained by the use of the comparison circuit.

It will be evident that the number of tubes in amplifier 12 can be varied, if desired, and that the circuit has other applications in electronic apparatus when the amplifier 10 and pickup 11 are eliminated.

Direct voltages of proper magnitude are applied to the lines 28 and 34 by a conventional power supply unit 86, this unit including the usual line switch 87, power transformer 88, full wave rectifier 89, filter inductance 90, filter condensers 91, 92 and output resistor 93. The output terminal of resistance 93 is attached directly to line 28 and it also leads through two series-connected voltage regulator tubes 94, 95 to ground, the wire 34 picking off a relatively low voltage for the screen grids of tubes 12a, 12b and 12c from the junction between regulators 94 and 95.

While the invention has been described in connection with a present, preferred embodiment thereof, it is to be understood that this description is illustrative only and is not intended to limit the invention, the scope of which is defined by the appended claims.

I claim:

1. In apparatus of the character described, an amplifier, an automatic volume control circuit having a relatively long time constant for controlling the gain of said amplifier so as to compensate for long-term variations in amplifier input, a rectifier fed by the output of said amplifier to rectify the output thereof, an integrating circuit fed by said rectifier and responsive to the rectified output of said amplifier, said integrating circuit having a relatively short time constant so as to respond to short term variations in amplifier input but not to long term variations in amplifier input, and means for measuring the integrated output of said last-mentioned circuit.

2. In apparatus of the character described, an amplifier, an automatic volume control circuit having a relatively long time constant for controlling the gain of said amplifier so as to compensate for long-term variations in amplifier input, a rectifier fed by the output of said amplifier to rectify the output thereof, an integrating circuit fed by said rectifier and responsive to the rectified output of said amplifier, said integrating circuit having a relatively short time constant so as to respond to short-term variations in amplifier input but not to long-term variations in amplifier input, the time constant of said automatic volume control circuit being at least ten times the time constant of said integrating circuit, and means for measuring the integrated output of said last-mentioned circuit.

3. A circuit for measuring the average intensity of short term disturbances relative to a slowly varying amplitude level which comprises, in combination, means for sensing said amplitude level and said disturbances, a variable gain amplifier fed by said sensing means, a rectifier fed by said amplifier, an integrating circuit having a relatively long time constant fed by said rectifier, the output of said integrating circuit controlling the amplifier gain so as to maintain a substantially constant signal level at the output of said amplifier, thereby compensating for changes in said amplitude level, a second integrating circuit fed by said rectifier having a relatively short time constant so as to respond to said short term disturbances, means for comparing the output of said last-mentioned integrating circuit with the amplifier output to produce a resultant ouput, and means for measuring said resultant output.

4. A circuit for measuring the average intensity of short term disturbances relative to a slowly varying amplitude level which comprises, in combination, means for sensing said amplitude level and said disturbances, a variable gain amplifier fed by said sensing means, a rectifier fed by said amplifier, an integrating circuit having a relatively long time constant fed by said rectifier, the output of said integrating circuit controlling the amplifier gain so as to maintain a substantially constant signal level at the output of said amplifier, thereby compensating for changes in said amplitude level, a second integrating circuit fed by said rectifier and having a relatively short time constant so as to respond to said short term disturbances, said relatively long time constant being at least ten times as great as said relatively short time constant, means for comparing the output of said last-mentioned integrating circuit with the amplifier output to produce a resultant output, and means for measuring said resultant output.

5. A circuit for measuring the average intensity of short-term disturbances relative to a slowly varying amplitude level which comprises, in combination, means for sensing said amplitude level and said disturbances, a variable gain amplifier fed by said sensing means, a rectifier fed by said amplifier, an integrating circuit having a relatively long time constant fed by said rectifier, the output of said integrating circuit controlling the amplifier gain so as to maintain a substantially constant signal level at the output of said amplifier, thereby compensating for changes in said amplitude level, a second integrating circuit fed by said rectifier and having a relatively short time constant so as to respond to said short-term disturbances, said relatively long time constant being at least ten times as great as said relatively short time constant, an indicating circuit including a pair of electron tubes each having an anode, a cathode and a control grid, means for supplying operating potentials to the electrodes of said tubes, a meter having one terminal thereof connected in the anode circuit of one tube and the other terminal thereof connected in the anode circuit of the other tube, means applying the output of said variable gain amplifier to one of said control grids, and means for applying the output of said integrating circuit having a relatively short time constant to the other of said control grids.

6. A circuit for measuring the average intensity of short-term fluctuations in acoustical noise relative to a slowly varying noise level which comprises, in combination, means for converting said noise level and said short-term variations into electrical voltages representative thereof, a filter for excluding voltages of preselected frequencies from the output of said converting means, an amplifier including at least one tube having an anode, a cathode, a control grid, and an additional electrode for varying the gain of said tube, means for feeding the output of said filter to said control grid, a rectifier circuit fed by the output of said amplifier, an integrating circuit having a relatively long time constant fed by the output of said rectifier, means for applying the output of said integrating circuit to said electrode, thereby to vary the amplifier gain and compensate for changes in said noise level, an integrating circuit fed by said rectifier having relatively short time constant so as to respond to said noise variations but not to changes in noise level, means for comparing the output of said last-mentioned integrating circuit with the amplifier output to produce a resultant output, and means for measuring said resultant output.

7. A circuit for measuring the average intensity of short-term fluctuations in acoustical noise relative to a slowly varying noise level which comprises, in combination, means for converting said noise level and said short-term variations into electrical voltages representative thereof, a filter for excluding voltages of preselected frequencies from the output of said converting means, an amplifier including at least one tube having an anode, a cathode, a control grid, and an additional electrode for varying the gain of said tube, means for feeding the output of said converting means to said control grid, a rectifier circuit fed by the output of said amplifier, an integrating circuit having a relatively long time constant fed by the output of said rectifier, means for applying the output of said integrating circuit to said electrode, thereby to vary the amplifier gain and compensate for changes in said noise level, an integrating circuit fed by said rectifier having relatively short time constant so as to respond to said noise variations but not to changes in noise level, said relatively long time constant being at least ten times as great as said relatively short time constant, an indicating circuit including a pair of electron tubes each having an anode, a cathode and a control grid, means for supplying operating potentials to the electrodes of said tubes, a meter having one terminal thereof connected in the anode circuit of one tube and the other terminal thereof connected in the anode circuit of the other tube, means applying the output of said variable gain amplifier to one of said indicating circuit control grids, and means for applying the output of said integrating circuit having a relatively short time constant to the other of said indicating circuit control grids.

8. A circuit for measuring the average intensity of short-term disturbances relative to a slowly varying amplitude level which comprises, in combination, means for sensing said amplitude level and said disturbances, a variable gain amplifier fed by said sensing means, an integrating circuit including a condenser, and a pair of series-connected resistances connected in shunt therewith, said integrating circuit having a relatively long time constant, a rectifier tube having an anode and a cathode, a resistor connecting said cathode to the junction between said condenser and one of said resistances, a condenser connected in shunt with the other of said resistances, an integrating condenser connected to the anode of said rectifier tube, a variable resistance having its fixed terminals connected to said last-mentioned condenser and said resistor, the integrating circuit thereby formed having a time constant less than one-tenth that of the first-mentioned integrating circuit, means for feeding the output of said amplifier to the cathode of said rectifier tube, means for comparing the amplifier output voltage with the voltage appearing at the contactor of said variable resistance to produce a resultant voltage, and means for measuring said resultant voltage.

9. A system for determining combustion instability in a jet engine having a burner wherein acoustical noise is produced by a flame, an electromagnetic detector positioned to pick up acoustical noise from the burner of said jet engine, an amplifier fed by said electromagnetic detector, an automatic volume control circuit having a relatively long time constant for controlling the gain of said amplifier so as to compensate for long-term variations in amplifier input, a rectifier fed by the output of said amplifier to rectify the output thereof, an integrating circuit fed by said rectifier and responsive to the rectified output of said amplifier, said integrating circuit having a relatively short time constant so as to respond to short term variations in amplifier input but not to long term variations in amplifier input, and means for measuring the integrated output of said last-mentioned circuit.

10. A system for determining combustion instability in a jet engine having a burner wherein acoustical noise is produced by a flame, an electromagnetic detector positioned to pick up acoustical noise from the burner of said jet engine, an amplifier fed by said electromagnetic detector, an automatic volume control circuit having a relatively long time constant for controlling the gain of said amplifier so as to compensate for long-term variations in amplifier input, a rectifier fed by the output of said amplifier to rectify the output thereof, an integrating circuit fed by said rectifier and responsive to the rectified output of said amplifier, said integrating circuit having a relatively short time constant so as to respond to short-term variations in amplifier input but not to long-term variations in amplifier input, the time constant of said automatic volume control circuit being at least ten times the time constant of said integrating circuit, and means for measuring the integrated output of said last-mentioned circuit.

11. A system for determining combustion instability in a jet engine having a burner wherein acoustical noise is produced by a flame, an electromagnetic detector positioned to pick up acoustical noise from the burner of said jet engine, an amplifier fed by said electromagnetic detector, an integrating circuit including a condenser, and a pair of series-connected resistances connected in shunt therewith, said integrating circuit having a relatively long time constant, a rectifier tube having an anode and a cathode, a resistor connecting said cathode to the junction between said condenser and one of said resistances, a condenser connected in shunt with the other of said resistances, an integrating condenser connected to the anode of said rectifier tube, a variable resistance having its fixed terminals connected to said last-mentioned condenser and said resistor, the integrating circuit thereby formed having a time constant less than one-tenth that of the first-mentioned integrating circuit, means for feeding the output of said amplifier to the cathode of said rectifier tube, means for comparing the amplifier output voltage with the voltage appearing at the contactor of said variable resistance to produce a resultant voltage, and means for measuring said resultant voltage.

References Cited in the file of this patent

UNITED STATES PATENTS

| | | |
|---|---|---|
| 1,907,415 | Carpenter et al. | May 2, 1933 |
| 2,286,106 | Ritzmann | June 9, 1942 |
| 2,340,714 | Traver et al. | Feb. 1, 1944 |
| 2,375,283 | Cloud | May 8, 1945 |
| 2,489,126 | Fay et al. | Nov. 22, 1949 |
| 2,523,017 | Harrison | Sept. 19, 1950 |
| 2,524,985 | Mayne | Oct. 10, 1950 |
| 2,542,160 | Stoner et al. | Feb. 20, 1951 |